(12) United States Patent
Hagiwara (10) Patent No.: US 6,216,090 B1
(45) Date of Patent: Apr. 10, 2001

(54) INTERFEROMETRIC PROCESSING METHOD TO IDENTIFY BED BOUNDARIES

(75) Inventor: Teruhiko Hagiwara, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/394,125

(22) Filed: Sep. 10, 1999

(51) Int. Cl.$^7$ ............................................. G01V 3/38
(52) U.S. Cl. ................................. 702/7; 702/11
(58) Field of Search .................... 324/338, 339; 702/7, 11, 12, 13

(56) References Cited

U.S. PATENT DOCUMENTS

| | | | |
|---|---|---|---|
| 4,529,938 | 7/1985 | Hagiwara | 324/339 |
| 5,757,191 | * 5/1998 | Gianzero | 324/339 |
| 5,869,968 | * 2/1999 | Brooks et al. | 324/338 |
| 5,900,733 | 5/1999 | Wu et al. | 324/338 |
| 6,060,884 | * 5/2000 | Meyer, Jr. et al. | 702/7 |
| 6,100,696 | * 8/2000 | Sinclair | 324/339 |

* cited by examiner

Primary Examiner—Donald E. McElheny, Jr.
(74) Attorney, Agent, or Firm—Conley, Rose & Tayon, P.C.

(57) ABSTRACT

A method and apparatus are disclosed for identifying boundaries between thin beds having different resistivities. In one embodiment, the method includes (a) transmitting an oscillatory signal from a first transmitter; (b) determining a first phase difference between signals induced in two receivers by the oscillatory signal from the first transmitter; (c) transmitting an oscillatory signal from a second transmitter; (d) determining a second phase difference between signals induced in the two receivers by the oscillatory signal from the second transmitter; and (e) calculating a interferometric difference between the first and second phase differences. When the transmitters are symmetrically located with respect to the receivers, the interferometric difference exhibits a maximum or minimum value near the boundary location. This low-complexity method provides good boundary detection results when the bed thickness is larger than the transmitter-receiver spacing. In a second method embodiment, the interferometric difference is calculated from the logarithm of the measured attenuation.

16 Claims, 9 Drawing Sheets

INTERFEROMETRIC PROCESSING METHOD TO IDENTIFY BED BOUNDARIES

TECHNICAL FIELD OF THE INVENTION

The present invention relates generally to downhole tools for determining characteristics of the borehole and formation during or after the drilling of a well. More particularly, the present invention relates to a resistivity logging tool for measuring formation resistivity parameters. Still more particularly, the present invention relates to a method for processing resistivity measurement variables to improve the detection of bed boundaries.

BACKGROUND OF THE INVENTION

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods.

In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole as the sonde is pulled uphole.

While wireline logging is useful in assimilating information relating to formations downhole, it nonetheless has certain disadvantages. For example, before the wireline logging tool can be run in the wellbore, the drillstring and bottomhole assembly must first be removed or "tripped" from the borehole, resulting in considerable cost and loss of drilling time for the driller (who typically is paying daily fees for the rental of drilling equipment). Because of these limitations associated with wireline logging, there has been an emphasis on developing tools that could collect data during the drilling process itself. By collecting and processing data during the drilling process, without the necessity of tripping the drilling assembly to insert a wireline logging tool, the driller can make accurate modifications or corrections in "real-time" to optimize drilling performance. Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that the term encompasses both the collection of formation parameters and the collection of information relating to the position of the drilling assembly while the bottomhole assembly is in the well.

The sensors used in a wireline sonde or MWD logging tools usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production,* Volume 1, at 54–63 (Gulf Publishing Co. 1981).

For a formation to contain petroleum, and for the formation to permit the petroleum to flow through it, the rock comprising the formation must have certain well known physical characteristics. One measurable characteristic is the resistivity (or conductivity) of the formation.

A variety of tool types are used for measuring resistivity. Induction tools are one type of resistivity tool generally known in the art. An induction tool comprises a pair of antenna coils, one of which transmits while the other receives. Induction tools measure the resistivity of the formation by measuring the current induced in the receiving antenna as a result of magnetic flux caused by current in the emitting antenna. Specifically, an alternating current with a known intensity is fed to the emitting coil or antenna. Current flow through the emitting coil induces currents in the formation that flow in coaxial loops around the tool. These currents in turn induce a signal in the receiving coil. This signal induced in the receiving coil can be measured and is generally proportional to the conductivity of the formation.

Of similar construction is a second type of resistivity tool called an electromagnetic propagation (EMP) tool. These tools operate at much higher frequencies than induction tools (about $10^6$ Hz as compared with about $10^4$ Hz). EMP tools use transmitter coils to transmit radio frequency signals into the formation, and use receiver coils to measure the relative amplitude and phase of the signals received by the receivers. The formation resistivity causes changes in the intensity and timing of the transmitted wave, so the receiver does not receive an exact copy of the wave that the transmitter sent. Instead, the resistivity of the formation reduces (or "attenuates") the intensity of the signal and causes a time delay (or "phase shift") in the signal. Accordingly, the attenuation and phase shift can be measured at the receiver and used to gauge the resistivity of the formation. Higher frequency signals provide a higher measurement accuracy, but tend to have a reduced investigation depth. Consequently, when multiple transmitter coils are present, the transmitter-receiver configuration(s) with a shallower investigation depth may employ a higher frequency (e.g. 2 MHz) for better accuracy, and transmitter-receiver configuration(s) with deeper investigation depths may require a lower frequency (e.g. 0.5 MHz) for adequate performance. Resistivity derived from attenuation measurements is commonly called "attenuation resistivity," and resistivity derived from phase measurements is commonly known as "phase resistivity." See generally, James R. Jordan, et al., *Well Logging II—Electric And Acoustic Logging,* SPE Monograph Series, Volume 10, at 71–87 (1986).

The various "beds" or layers in the earth have characteristic resistivities which can be used to identify their position.

For example, in a so-called "shaley-sand" formation, the shale bed can have a low resistivity of about 1 ohm-m. A bed of oil-saturated sandstone, on the other hand, is likely to have a higher resistivity of about 10 ohm-m, or more. The sudden change in resistivity at the boundary between beds of shale and sandstone can be used to locate these boundaries. However, for relatively thin beds and deviated boreholes, this detection can be difficult to accomplish reliably.

SUMMARY OF THE INVENTION

Accordingly, there is provided herein a method and apparatus for identifying boundaries between thin beds having different resistivities. In one embodiment, the method includes (a) transmitting an oscillatory signal from a first transmitter; (b) determining a first phase difference between signals induced in two receivers by the oscillatory signal from the first transmitter; (c) transmitting an oscillatory signal from a second transmitter; (d) determining a second phase difference between signals induced in the two receivers by the oscillatory signal from the second transmitter; and (e) calculating a interferometric difference between the first and second phase differences. When the transmitters are symmetrically located with respect to the receivers, the interferometric difference exhibits a maximum or minimum value near the boundary location. This low-complexity method provides good boundary detection results when the bed thickness is larger than the transmitter-receiver spacing. In a second method embodiment, the interferometric difference is calculated from the logarithm of the measured attenuation.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

As with all downhole well components, resistivity tools are exposed to a harsh environment that includes a wide temperature and pressure range. To avoid a correspondingly wide variation in tool performance, various compensation techniques are employed. One useful compensation technique for resistivity tools is to provide the tool with a symmetric configuration. It is herein proposed that the symmetric halves of such tools can be used in an "interfering" fashion to detect bed boundaries.

Figure 1:
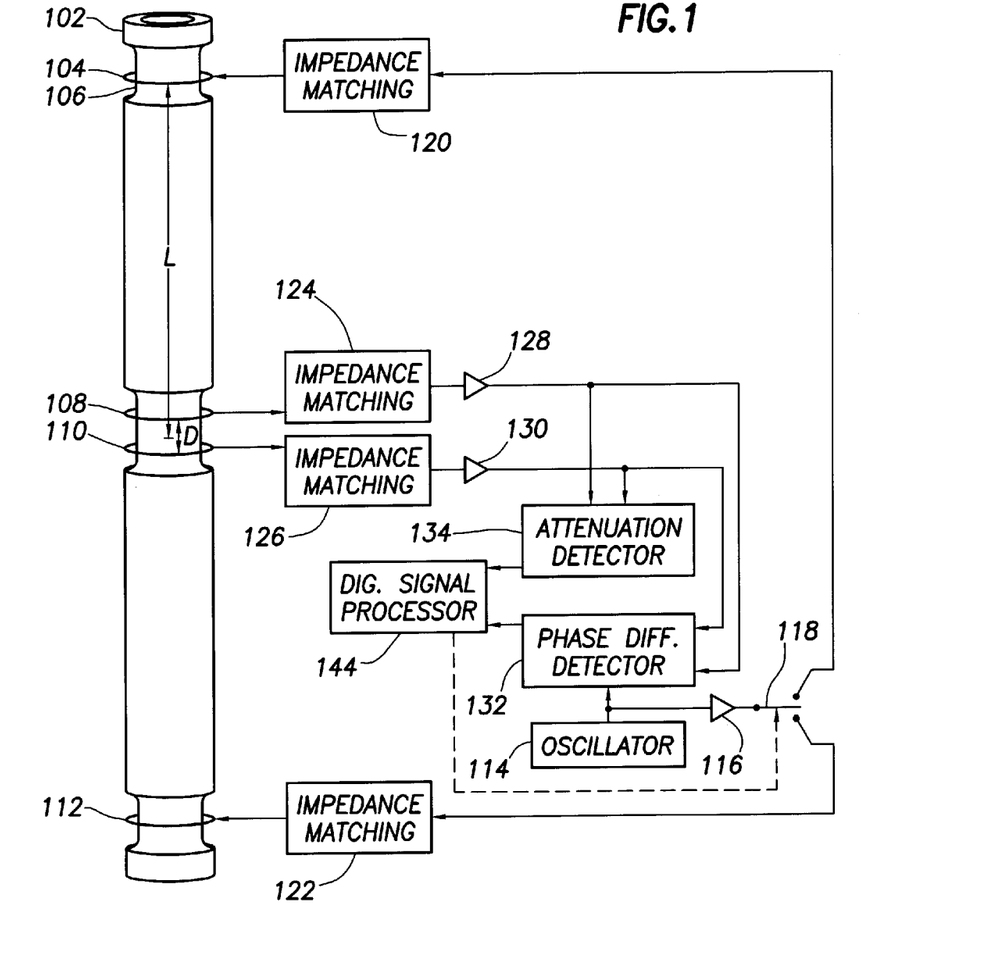
FIG. 1 is a block diagram (in part) of a resistivity tool according to a preferred embodiment.

Turning now to the figures, FIG. 1 shows a resistivity tool subassembly 102. The subassembly 102 is provided with one or more regions 106 of reduced diameter. A wire coil 104 is placed in the region 106 and spaced away from the surface of subassembly 102 by a constant distance. To mechanically support and protect the coil 104, a non-conductive filler material (not shown) such as epoxy, rubber, or ceramics may be used in the reduced diameter regions 106. Coils 104 and 112 are transmitter coils, and coils 108 and 110 are receiving coils. In operation, transmitter coils 104 and 112 alternately transmit interrogating electromagnetic signals which propagate through the wellbore and surrounding formation. Receiver coils 108, 110 detect the interrogating electromagnetic signals and provide a measure of the amplitude attenuation and phase shift between coils 108 and 110. From the amplitude attenuation and phase shift, the resistivity of the formation can be estimated using conventional techniques.

The transmitter and receiver coils may comprise as little as one loop of wire, although more loops may provide additional signal power. The distance between the coils and the tool surface is preferably in the range from $\frac{1}{16}$ inch to $\frac{3}{4}$ inch, but may be larger. The spacing D between the receiver coils 108, 110 is preferably between 1 and 15 inches, and the transmitter-receiver spacing L is preferably between 10 and 30 inches.

Oscillator 114 generates a sinusoidal signal. Amplifier 116 amplifies the sinusoidal signal and switch 118 routes the amplified signal through one of the impedance matching circuits 120, 122 to the corresponding transmitter coil. Signals from the receiver coils 108, 110 pass through corresponding impedance matching circuits 124 and 126 and are amplified by corresponding amplifiers 128 and 130. Attenuation detector 134 measures the amplitude of the signals from the amplifiers 128, 130, and determines attenuation by finding the ratio of the signal amplitudes. Phase difference detector 132 measures the phase difference between the signals from amplifiers 128, 130. The digital signal processor 144 reads the attenuation and phase difference measurements from the detectors 132, 134. The digital signal processor controls the setting of switch 118 to measure the attenuation and/or phase shift of signals propagating from either transmitter. One implementation of attenuation detector 134 and phase difference detector 132 is described in U.S. Pat. No. 5,389,881 (Bittar, et. al.) which is hereby incorporated herein by reference.

Figure 10:
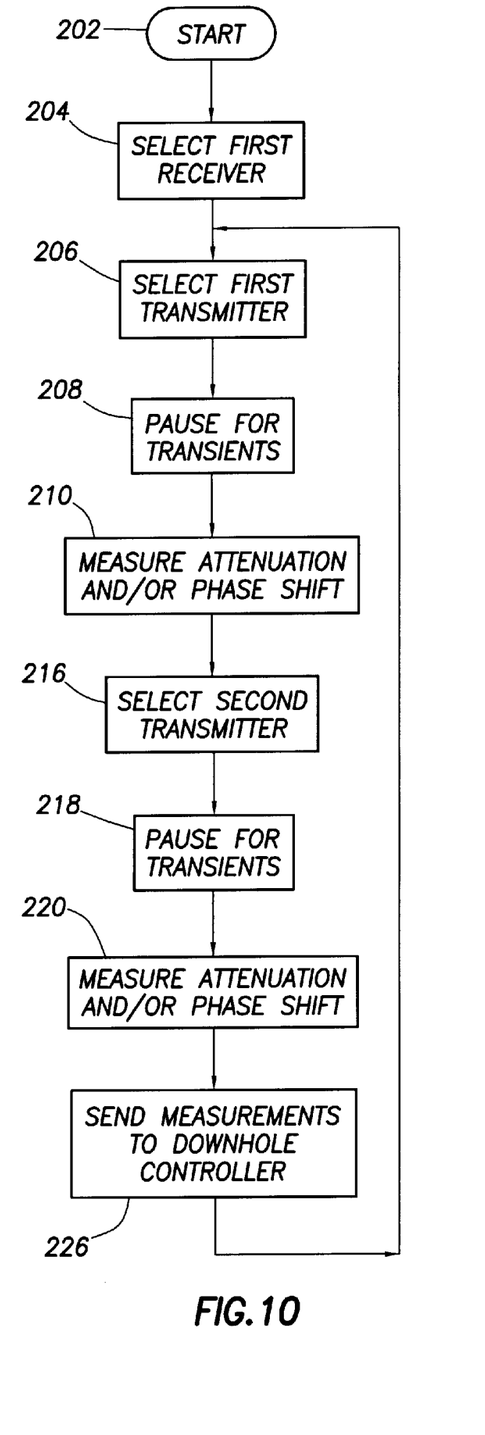
FIG. 10 is a flowchart of a method for measuring attenuation and/or phase shift in a resistivity tool.

An exemplary flowchart of the software executed by the digital signal processor 144 is shown in FIG. 10. Starting at block 202, the digital signal processor sets switch 132 to select receiver 108 in block 204. In block 206, the digital signal processor sets switch 118 to select transmitter 104. A pause is made in block 208 to allow the transient ringing of the coils to damp out. Then in block 210 the digital signal processor measures the attenuation and/or phase shift of the signal between receivers 108, 110. In block 216, the digital signal processor selects transmitter 112 and pauses in block 218 to again allow the transient ringing of the coils to damp out. A determination of the attenuation and/or phase shift of the signal between receivers 110, 108 is made in block 220. The determined attenuation and phase shifts are provided to the downhole controller in block 226, and the digital signal processor returns to block 206.

Figure 11:
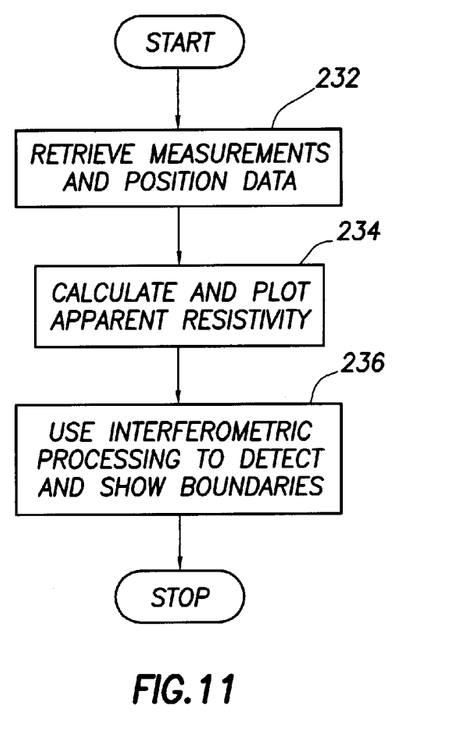
FIG. 11 is a flowchart of a method for detecting bed boundaries.

The downhole controller gathers the measurements from a variety of sensors including the resistivity sensor, encodes the measurements, and transmits the measurements to the surface, where they are combined with position information. The measurements are processed on the surface to determine downhole formation characteristics. FIG. 11 shows one method for processing the attenuation and phase shift measurements from the resistivity tool. A surface processor (typically a personal computer) retrieves the measurements and position information in block 232. In block 234, the surface processor calculates the apparent resistivity from the measurements, and plots the apparent resistivity as a function of the position. The apparent resistivity is the resistivity of a homogeneous formation that would produce the measured attenuation and/or phase shift. The apparent resistivity calculated from attenuation measurements is not necessarily the same as the apparent resistivity calculated from phase measurements. Accordingly, the apparent resistivity is also termed attenuation resistivity or phase resistivity to indicate the measurements upon which the calculation is based.

In block 236, the surface processor uses a straightforward interferometric processing technique described below to determine the presence and location of boundaries, and plots the boundaries on the apparent resistivity graph. This technique is much less computationally intensive than other techniques such as de-convolution.

A derivation is now made to demonstrate how two symmetric halves of a resistivity tool can be used to provide compensation, and how those same halves can be used to calculate an interferometric measurement. An example of the compensated measurements and interferometric measurements for various device configurations will be discussed afterwards.

The voltage induced in a receiver coil R by a signal in a transmitter coil T can be written:

$$V = \xi_T \xi_R A \, e^{i(\phi + \Phi_T + \Phi_R)}, \quad (1)$$

where $\xi_T$ and $\xi_R$ are intrinsic efficiencies of the transmitter T and receiver R, respectively, and $\Phi_T$ and $\Phi_R$ are intrinsic phase shifts induced by the transmitter T and receiver R, respectively. In subsequent equations, subscripts "u" and "L" will be used to differentiate between the upper and lower transmitter and receiver coils. For example, $T_u$ designates the upper transmitter 104, and $R_L$ designates the lower receiver 110. The ideal amplitude A and ideal phase $\phi$ will be provided with subscripts "+" and "−" to indicate whether they correspond to the transmitter receiver spacing of L+(D/2) or L−(D/2) (L and D are shown in FIG. 1).

The ratio between voltages induced in the two receiver coils from the upper transmitter is:

$$\frac{V_{R_L T_U}}{V_{R_U T_U}} = \frac{\xi_{R_L}}{\xi_{R_U}} \eta_u e^{i(\delta \varphi_U + \phi_{R_L} - \phi_{R_U})}, \quad (2)$$

where $\eta_U = A_+/A_-$ is the ideal attenuation, and $\delta\phi_U = \phi_+ - \phi_-$ is the ideal phase shift in the signal from the upper transmitter. Similarly, the ratio between voltages induced by the lower transmitter is:

$$\frac{V_{R_U T_L}}{V_{R_L T_L}} = \frac{\xi_{R_U}}{\xi_{R_L}} \eta_L e^{i(\delta \varphi_L + \phi_{R_U} - \phi_{R_L})}. \quad (3)$$

The intrinsic receiver efficiency and phase can be eliminated by combining equations (2) and (3)

$$\sqrt{\frac{V_{R_L T_U}}{V_{R_U T_U}} \frac{V_{R_U T_L}}{V_{R_L T_L}}} = \sqrt{\eta_u \eta_L} \, e^{i(\delta\varphi_U + \delta\varphi_L)/2}. \quad (4)$$

Equation (4) therefore represents a way of compensating for variations in intrinsic efficiency and phase and to obtain correct attenuation and phase shift measurements when the formation is homogeneous ($\eta_U = \eta_L$ and $\delta\phi_U = \delta\phi_L$).

It is important to eliminate the intrinsic circuit biases when absolute resistivity measurements are needed. However, boundary detection focuses on identifying sharp changes in resistivity. Accordingly, the attenuation and phase resistivity measurements using upper and lower transmitters can be combined in a different manner to highlight changes in phase and attenuation that are indicative of bed boundaries.

Consider the situation where the center of the resistivity tool is positioned at a boundary between two thick seismic beds. The signals travelling from one transmitter to the receivers travel mostly through one bed, while the signals travelling to the receivers from the other transmitter travel mostly through the other bed. The attenuation and phase shifts of the signals are indicative of the resistivity of the beds through which they travel, and the difference between the attenuations and phase shifts is maximized when the tool is centered at the boundary. The difference decreases as the tool moves away from the boundary. To measure the variations in attenuation and phase shift, the amplitude and phase of equations (2) and (3) is measured, and the differences taken. The following interferometric variations are proposed:

$$I(\delta\phi) = (\delta\phi_u + \Phi_u - \Phi_L) - (\delta\phi_L + \Phi_L - \Phi_u) = \delta\phi_u - \delta\phi_L + 2(\Phi_u - \Phi_L) \quad (5)$$

$$I(\ln\eta) = \ln\left(\frac{\xi_{R_L}}{\xi_{R_U}} \eta_u\right) - \ln\left(\frac{\xi_{R_U}}{\xi_{R_L}} \eta_L\right) = \ln(\eta_u) - \ln(\eta_L) + 2\ln\left(\frac{\xi_{R_L}}{\xi_{R_U}}\right) \quad (6)$$

The last term in each equation is relatively constant in the neighborhood of any given boundary. The preceding terms are equal in a homogeneous formation, but one always changes before the other as the tool crosses a boundary. Extreme values (local maximums and minimums) in the difference are indicative of the location of the boundary.

Figure 2:
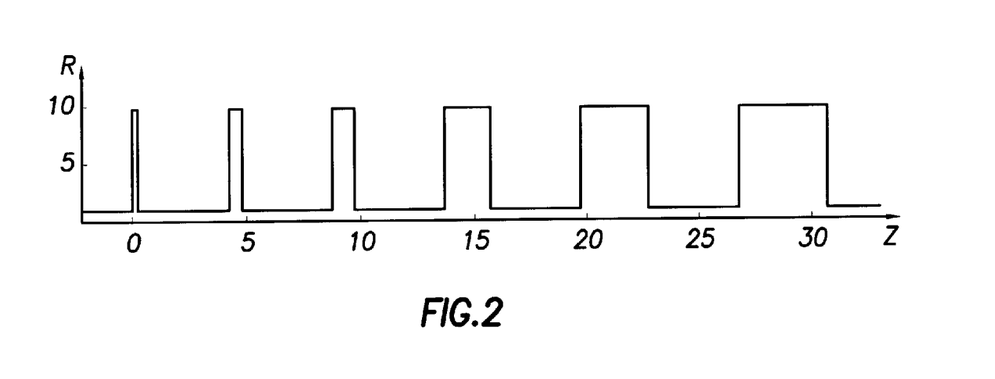
FIG. 2 is a graph showing resistivity as a function of depth for a series of progressively thicker beds.

FIG. 2 shows an actual resistance of a hypothetical series of formation beds that is used below to demonstrate the performance of the interferometric technique. The formation includes six "thin" beds with a resistivity of 10 Ω-m, separated by "shoulder" beds with a resistivity of 1 Ω-m. The low-resistivity beds are 4 feet thick, while the high-resistivity beds have varying thicknesses of ¼, ½, 1, 2, 3, and 4 feet.

Figure 3:
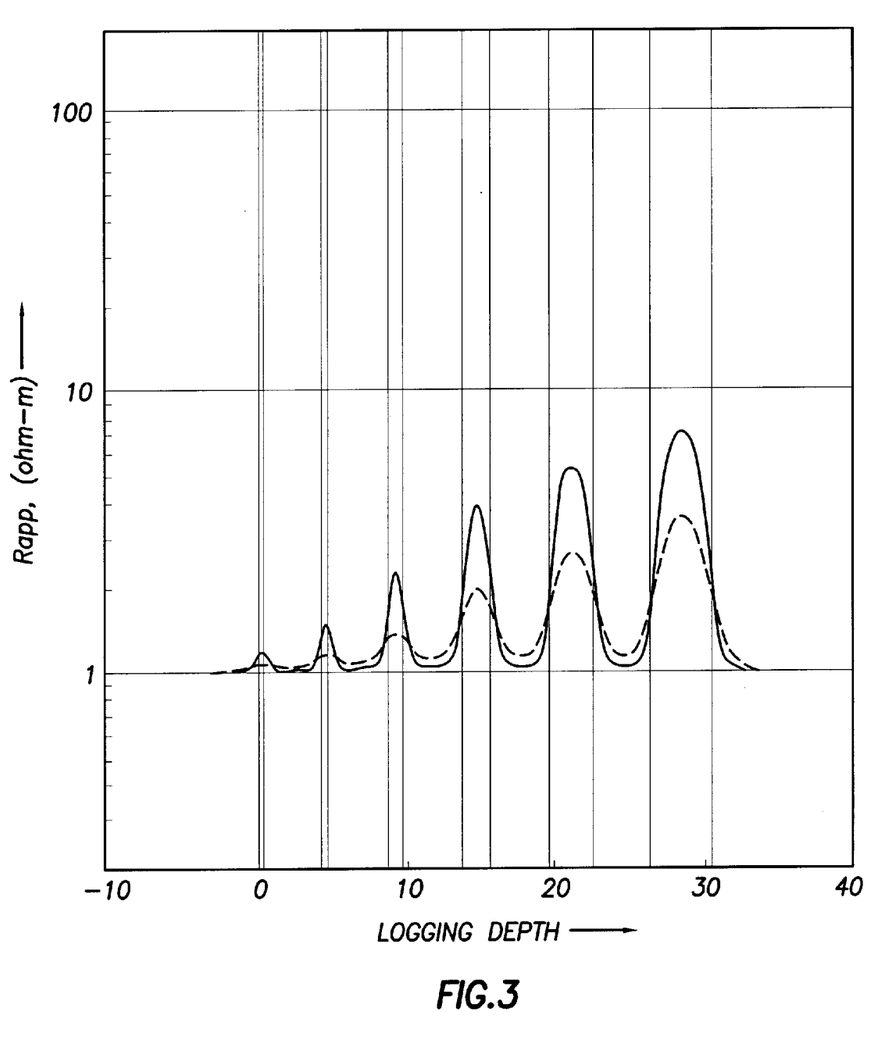
FIG. 3 is a graph of apparent resistivity as indicated by measured attenuation and phase shift.
Figure 4:
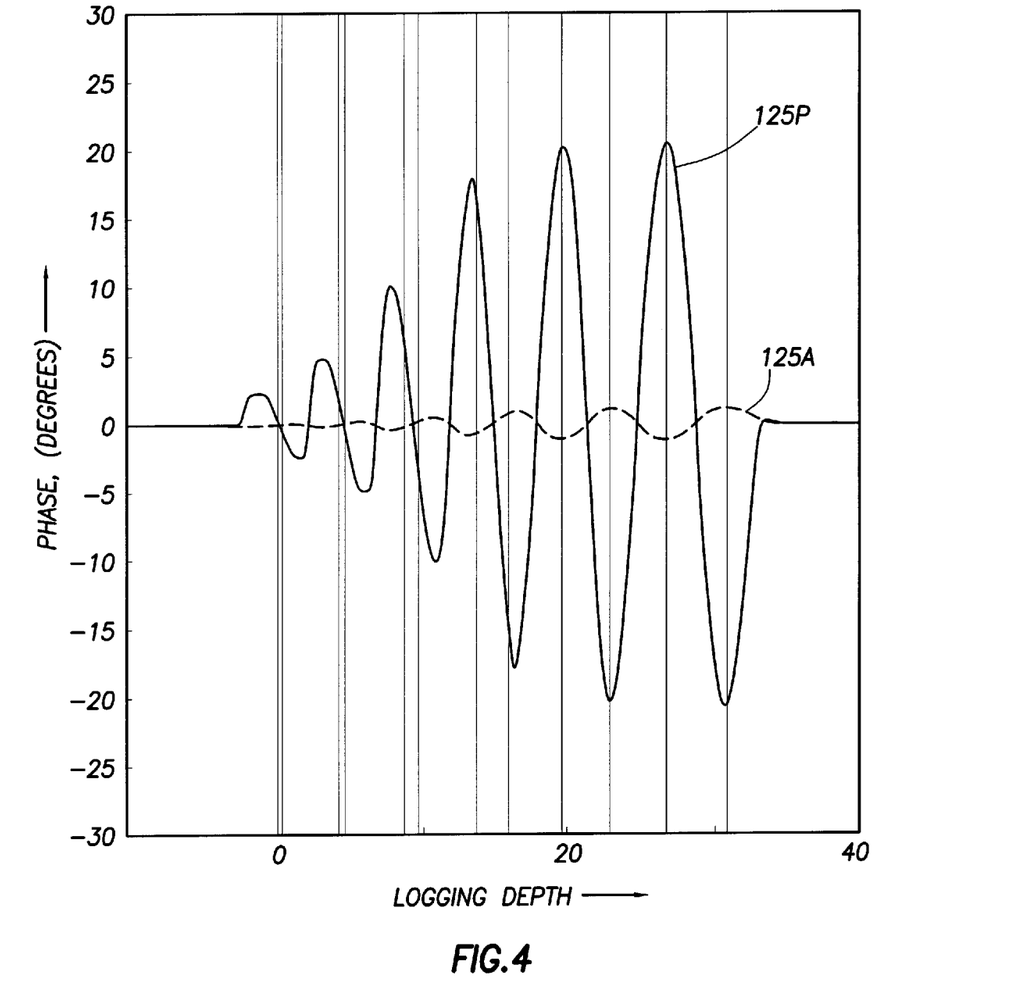
FIG. 4 is a graph of interferometric differences in both phase and amplitude.

FIG. 3 shows apparent attenuation resistivity (broken line) and apparent phase resistivity (solid line) as measured by a compensated resistivity tool having L=25" and D=10" and operating at a frequency of 2 MHz. Actual bed boundaries are shown by vertical solid lines. FIG. 4 shows the interferometric attenuation (broken line) and phase shift (solid line) variations for the same tool configuration. For bed thicknesses less than 1 foot, the interferometric variation fails to accurately locate the boundaries. However, the peaks in the interferometric variations clearly correspond to the boundaries for thicknesses larger than 1 foot. The interferometric phase variation appears to provide a better sensitivity to the presence of boundaries than the interferometric attenuation variation.

Figure 5:
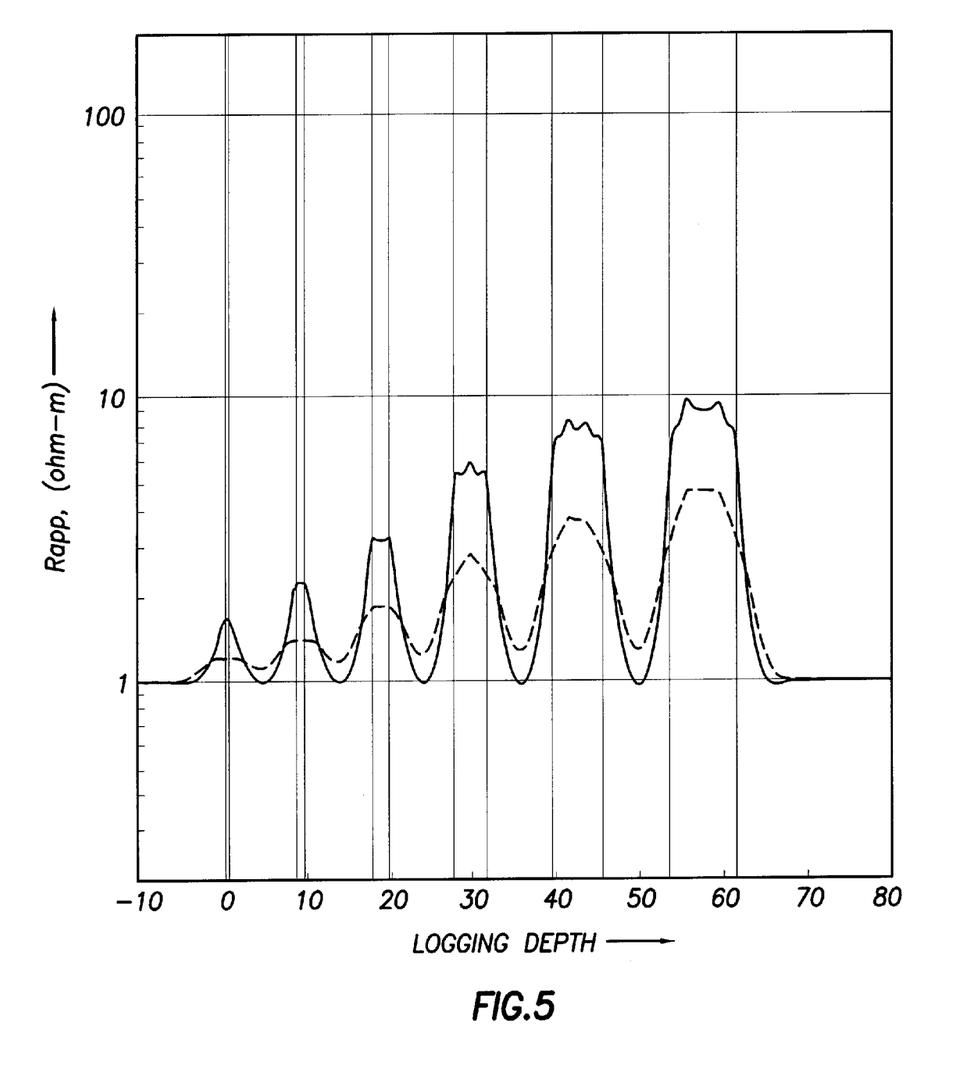
FIG. 5 is graph of apparent resistivity for dipping beds.
Figure 6:
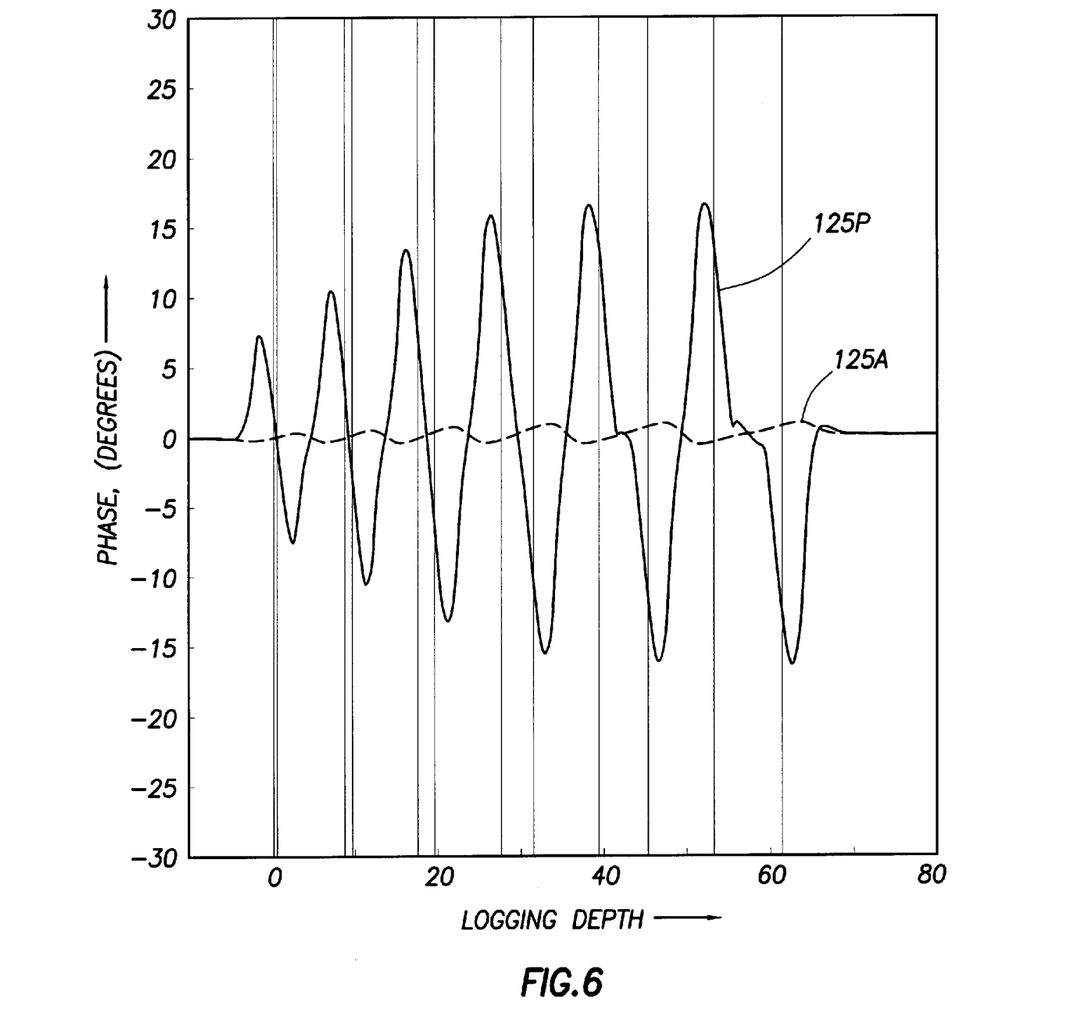
FIG. 6 is a graph of interferometric differences for dipping beds.

FIG. 5 shows the apparent attenuation resistivity and apparent phase resistivity for the same tool configuration when the tool encounters the beds at a 60° dip angle. It is noted that the boundary "horns" may cause difficulty in identifying the number and location of bed boundaries. FIG. 6 shows the interferometric attenuation and phase shift variations, and here a clear correspondence exists between the peaks in the interferometric phase shift variation and the bed boundaries.

Figure 7:
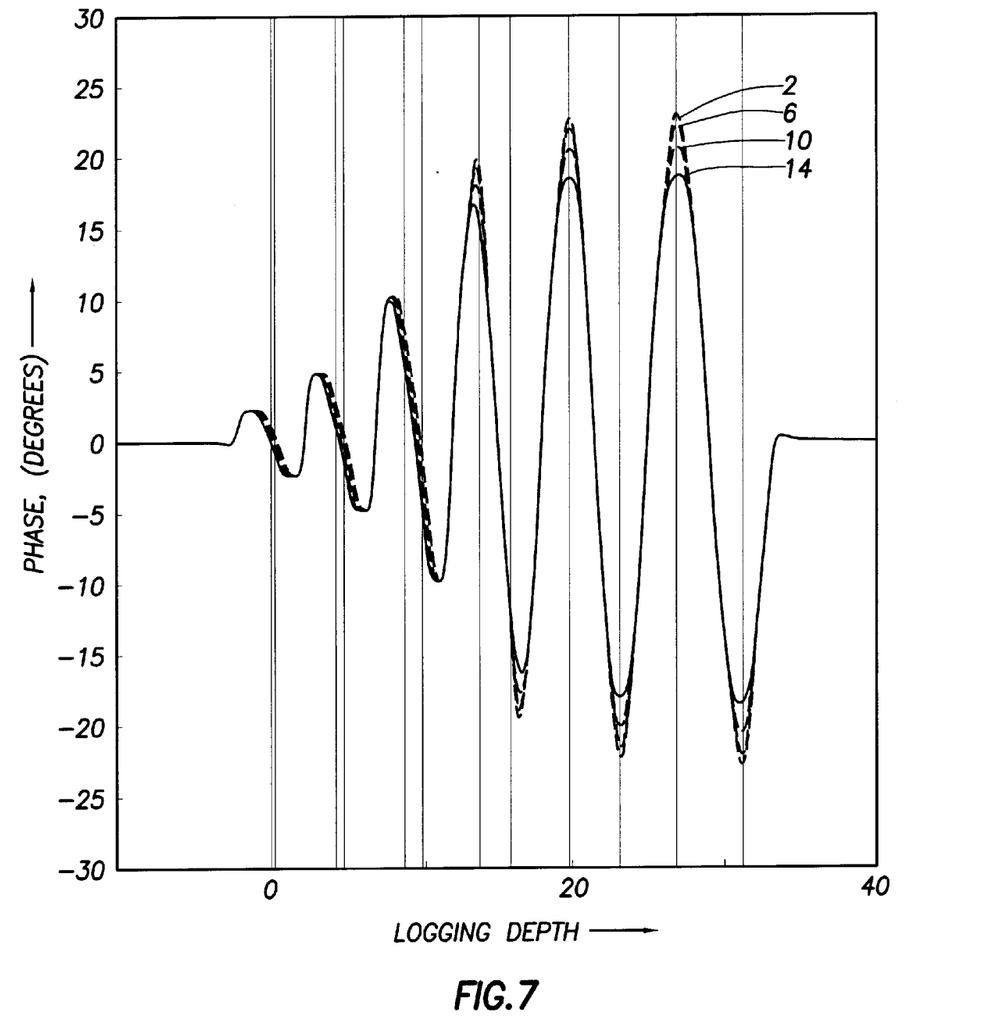
FIG. 7 is a graph of interferometric phase differences for different receiver spacings.
Figure 8:
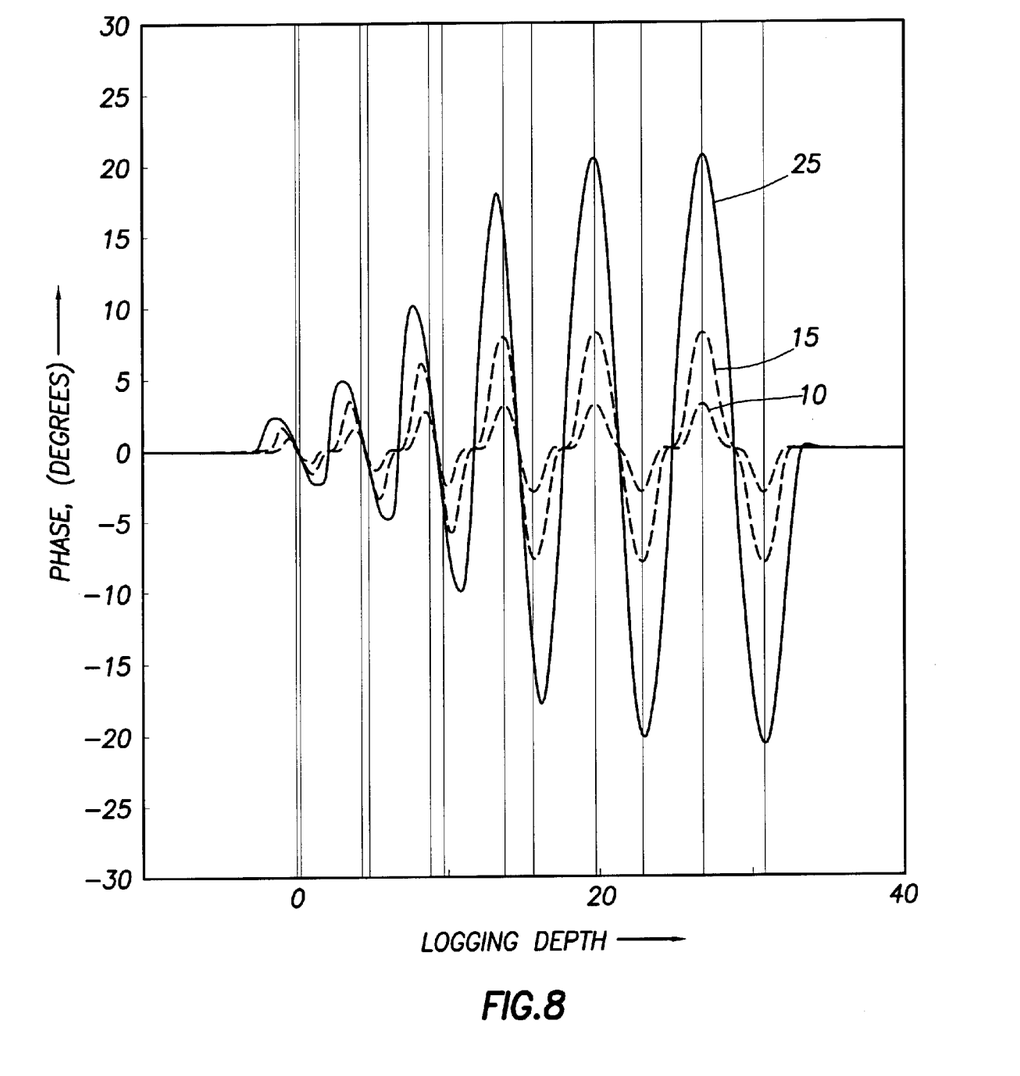
FIG. 8 is a graph of interferometric phase differences for different transmitter-receiver spacings.
Figure 9:
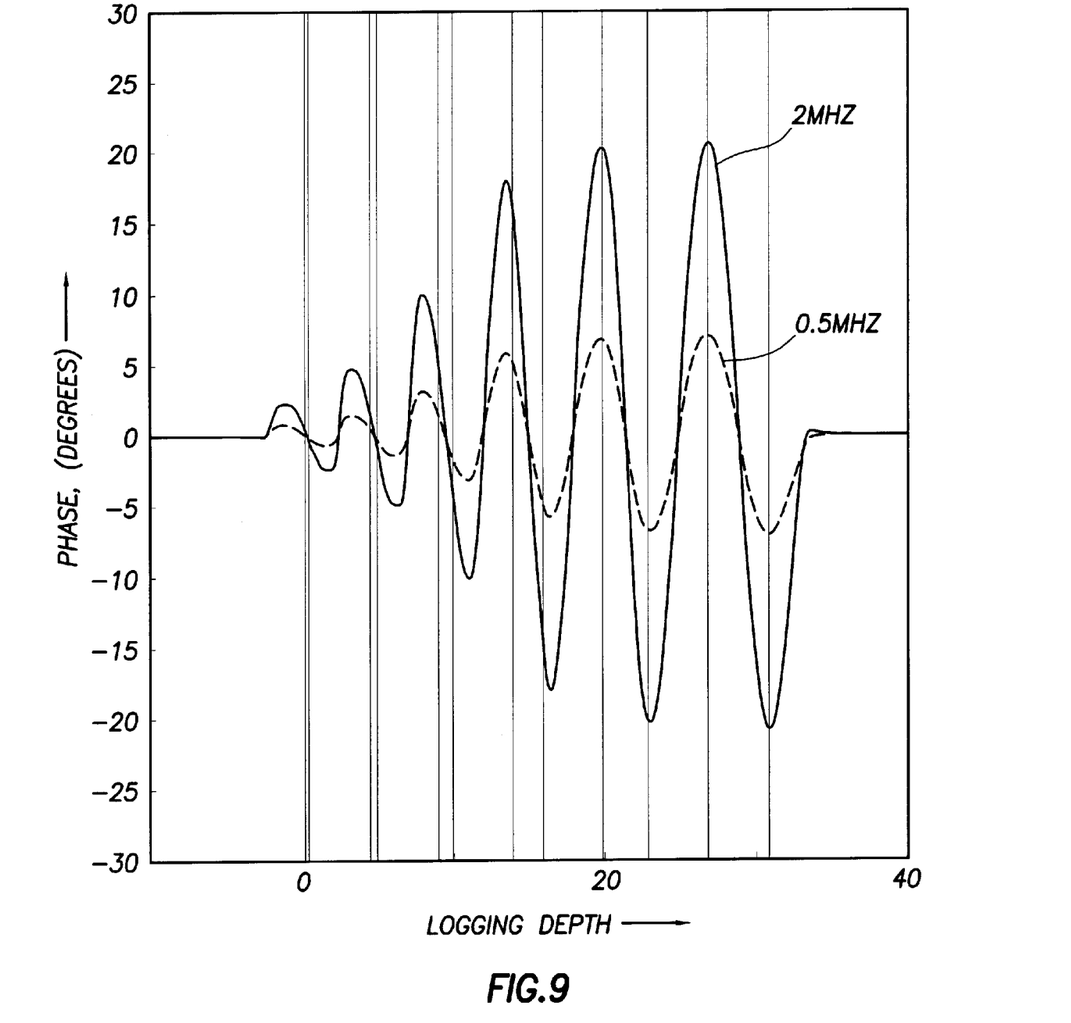
FIG. 9 is a graph of apparent phase resistivity for different signal frequencies.

Returning to the original bed dip angle, FIG. 7 shows interferometric phase shift variation for tools with a varying receiver spacing of D=2", 6", 10", and 14". Although the peaks move slightly for thinner beds, the main effect of varying the receiver spacing is the increased amplitude of the peaks for shorter spacings. FIG. 8 shows interferometric phase shift variation for tools with a varying transmitter-receiver spacing of L=10", 15", and 25". For the shorter spacings, the peaks much more closely correspond with the boundaries of thin beds, although a price is paid in terms of the amplitude of the peaks. It is noted that the shorter spacings allow significantly better boundary detection for bed thicknesses less than 1 foot. FIG. 9 shows the interferometric phase shift variation for two frequencies f=0.5 MHz and 2 MHz. The higher frequency has a higher amplitude and better correspondence of peaks to bed boundaries.

It is noted that the interferometric differences can be found from the logarithm of the ratio of equations (2) and (3):

$$\ln\left(\frac{V_{R_L T_U}}{V_{R_U T_U}} \Big/ \frac{V_{R_U T_L}}{V_{R_L T_L}}\right) = \ln\left[\left(\frac{\xi_{R_L}}{\xi_{R_U}}\right)^2 \frac{\eta_u}{\eta_L} e^{i(\delta\varphi_U - \delta\varphi_L + 2(\phi_{R_L} - \phi_{R_U}))}\right] \quad (7)$$

$$\ln\left(\frac{V_{R_L T_U}}{V_{R_U T_U}} \Big/ \frac{V_{R_U T_L}}{V_{R_L T_L}}\right) = \ln\eta_U - \ln\eta_L + 2\ln\left(\frac{\xi_{R_L}}{\xi_{R_U}}\right) + \quad (8)$$
$$i(\delta\varphi_U - \delta\varphi_L + 2(\phi_{R_L} - \phi_{R_U}))$$

$$\ln\left(\frac{V_{R_L T_U}}{V_{R_U T_U}} \Big/ \frac{V_{R_U T_L}}{V_{R_L T_L}}\right) = I(\ln\eta) + iI(\delta\varphi) \quad (9)$$

Taking the magnitude of this logarithm effectively combines the interferometric differences, but the interferometric phase shift variation dominates. This interferometric magnitude may be preferred in some situations.

Returning to FIG. 11, in block 236 the surface processor calculates the interferometric variations as a function of position, and identifies initial boundary locations at the local minimum and local maximum points. It may be preferred to establish predetermined thresholds relative to the average interferometric variation that the local maximum or local minimum must exceed before a boundary is identified. For example, the local maximum or minimum interferometric phase variation might be required to be at least 10 degrees away from the average variation, or the interferometric attenuation variation might be required to be 3 dB away from the average. In some embodiments, the surface processor will adjust the initial boundary locations if the bed is determined to have a thickness less than some threshold.

While the present invention has been described and disclosed in terms of a preferred embodiment, it will be understood that variations in the details thereof can be made without departing from the scope of the invention.

What is claimed is:

1. A method for identifying bed boundaries, wherein the method comprises:

transmitting an oscillatory signal from a first transmitter;

determining a first phase difference between signals induced in two receivers by the oscillatory signal from the first transmitter;

transmitting an oscillatory signal from a second transmitter;

determining a second phase difference between signals induced in the two receivers by the oscillatory signal from the second transmitter; and calculating a interferometric difference between the first and second phase differences.

2. The method of claim 1, further comprising:

identifying a bed boundary when the interferometric difference exceeds a threshold value.

3. The method of claim 1, further comprising:

plotting the interferometric difference as a function of position.

4. The method of claim 1, further comprising:

identifying a bed boundary where the interferometric difference reaches an extreme value.

5. The method of claim 1, further comprising:

adding the first and second phase differences to determine a compensated phase difference;

calculating an apparent resistivity from the compensated phase difference;

plotting the apparent resistivity as a function of position; and plotting lines to indicate bed boundaries at points where the interferometric difference reaches a local maximum or a local minimum.

6. A method for identifying bed boundaries, wherein the method comprises:

transmitting an oscillatory signal from a first transmitter;

determining a first amplitude ratio between signals induced in two receivers by the oscillatory signal from the first transmitter;

transmitting an oscillatory signal from a second transmitter;

determining a second amplitude ratio between signals induced in the two receivers by the oscillatory signal from the second transmitter; and calculating a interferometric difference between the first and second amplitude ratios.

7. The method of claim 6, further comprising:

identifying a bed boundary when the interferometric difference exceeds a threshold value.

8. The method of claim 6, further comprising:

plotting the interferometric difference as a function of position.

9. The method of claim 6, further comprising:

identifying a bed boundary where the interferometric difference reaches an extreme value.

10. The method of claim 6, further comprising:

determining a square root of a product of the first and second amplitude ratios to determine a compensated attenuation;

calculating an apparent resistivity from the compensated attenuation;

plotting the apparent resistivity as a function of position;

plotting lines to indicate bed boundaries at points where the interferometric difference reaches a local maximum or a local minimum.

11. A method for identifying bed boundaries, wherein the method comprises:

transmitting a sinusoidal signal from a first transmitter coil;

determining a first signal ratio between signals generated in two receiver coils by the first transmitter coil;

transmitting a sinusoidal signal from a second transmitter coil located symmetrically from the first transmitter coil with respect to the two receiver coils;

determining a second signal ratio between signals generated in the two receiver coils by the second transmitter coil; and operating on the first and second signal ratios to determine a interferometric signal indicative of a bed boundary location.

12. The method of claim 11, wherein said operating includes:

calculating a logarithm of the first signal ratio divided by the second signal ratio; and finding a magnitude of the logarithm to produce an interferometric signal.

13. The method of claim 11, wherein said operating includes:

calculating a first attenuation from the first signal ratio;

calculating a second attenuation from the second signal ratio; and subtracting the logarithm of the second attenuation from the logarithm of the first attenuation to produce the interferometric signal.

14. The method of claim 11, wherein said operating includes:

calculating a first phase shift from the first signal ratio;

calculating a second phase shift from the second signal ratio;

subtracting the second phase shift from the first phase shift to produce the interferometric signal.

15. The method of claim 11, further comprising:

finding local maximums and local minimums of the interferometric signal; and identifying bed boundary locations at positions corresponding to local maximums and local minimums that exceed predetermined thresholds from an average interferometric value.

16. The method of claim 11, further comprising:

operating on the first and second signal ratios to determine an apparent resistivity signal indicative of formation resistivity;

plotting the apparent resistivity signal as a function of resistivity tool position in a borehole;

finding local maximums and local minimums of the interferometric signal; and plotting bed boundary lines across the apparent resistivity signal at positions corresponding to local maximums and local minimums that exceed predetermined thresholds from an average interferometric value.

* * * * *